Nov. 28, 1944. H. G. KELLOGG 2,363,972
METHOD AND APPARATUS FOR MANUFACTURING METAL NAILING STRIPS
Filed April 20, 1942 4 Sheets-Sheet 4
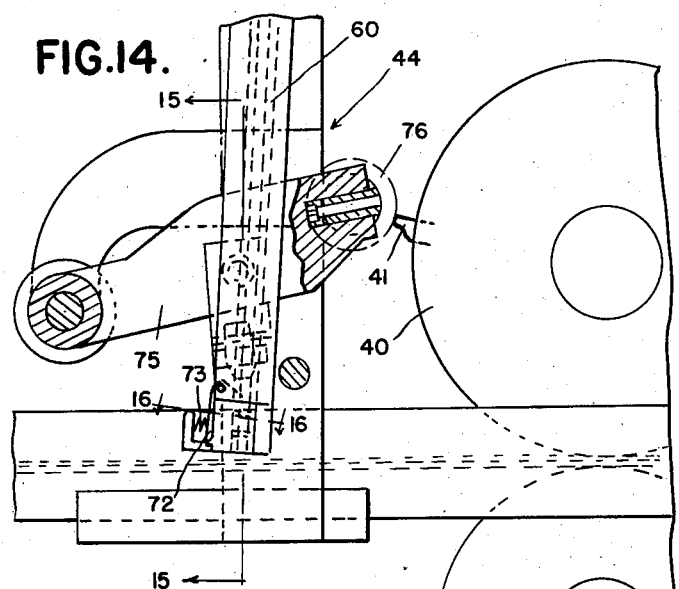
FIG.14.
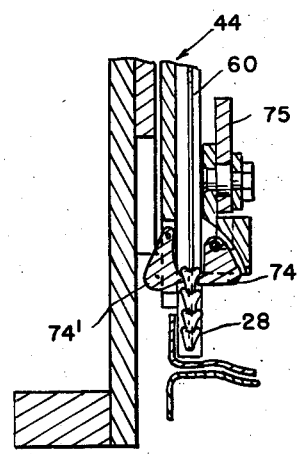
FIG.15.
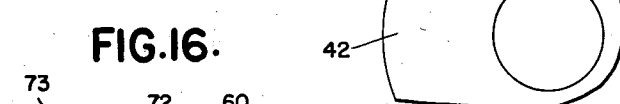
FIG.16.
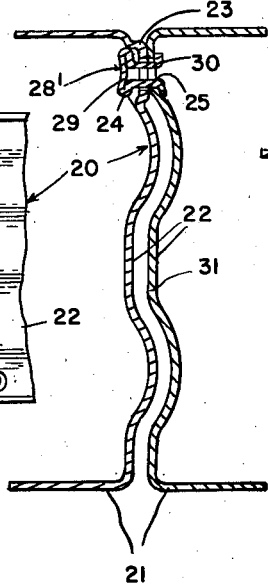
FIG.18.
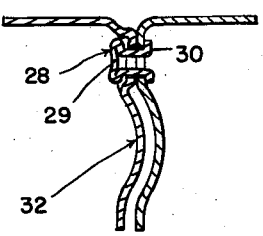
FIG.19A.
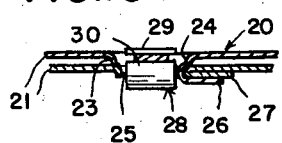
FIG.17.
FIG.19.
INVENTOR.
HOMER G. KELLOGG
BY
Whittemore Hulbert Belknap
ATTORNEYS Patented Nov. 28, 1944

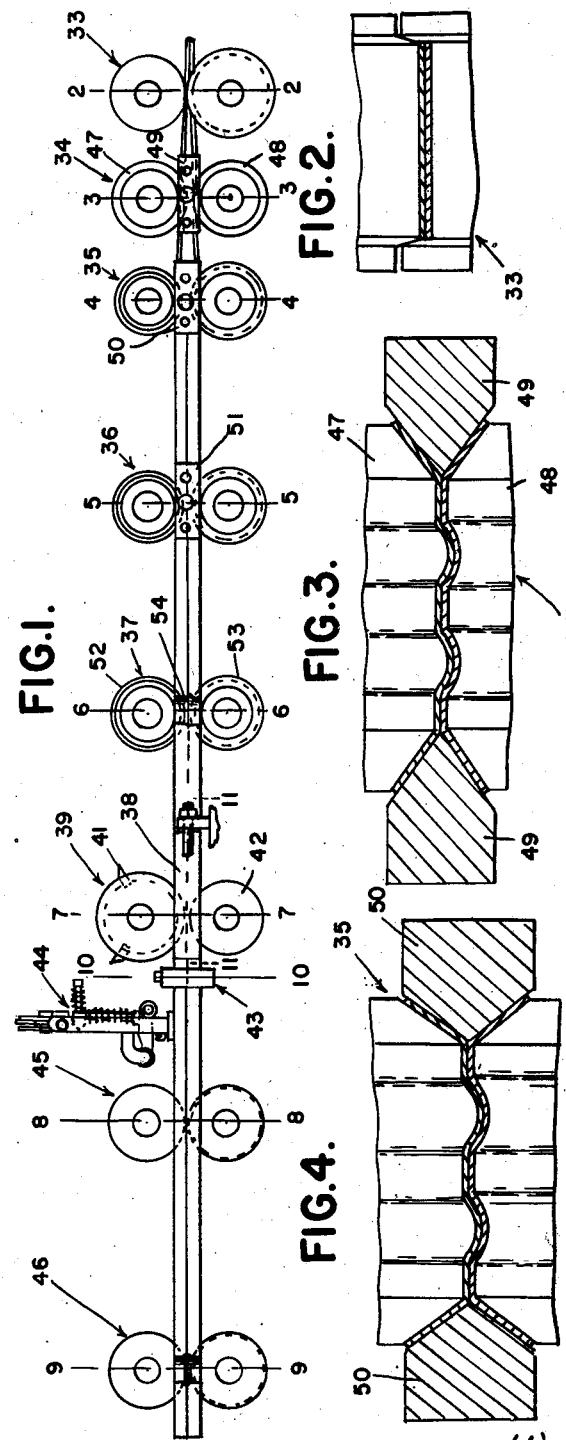

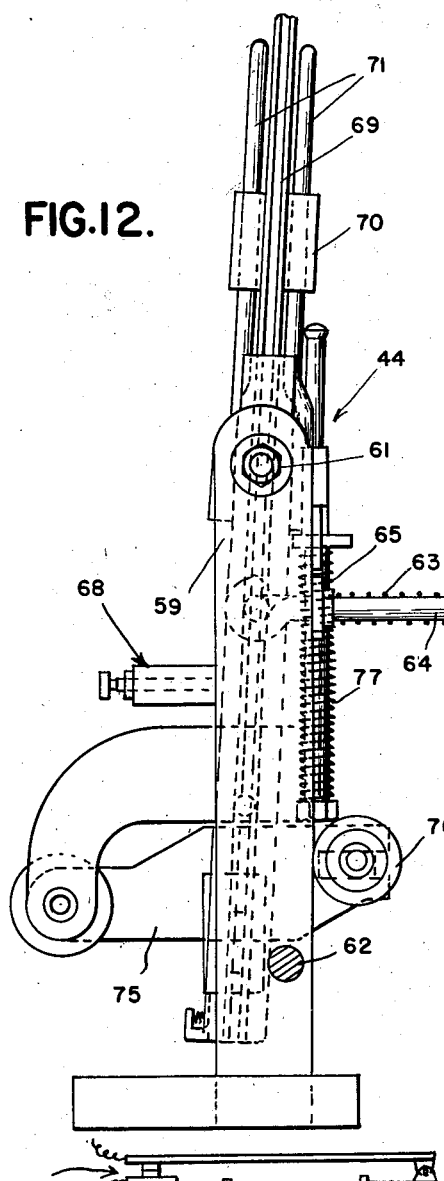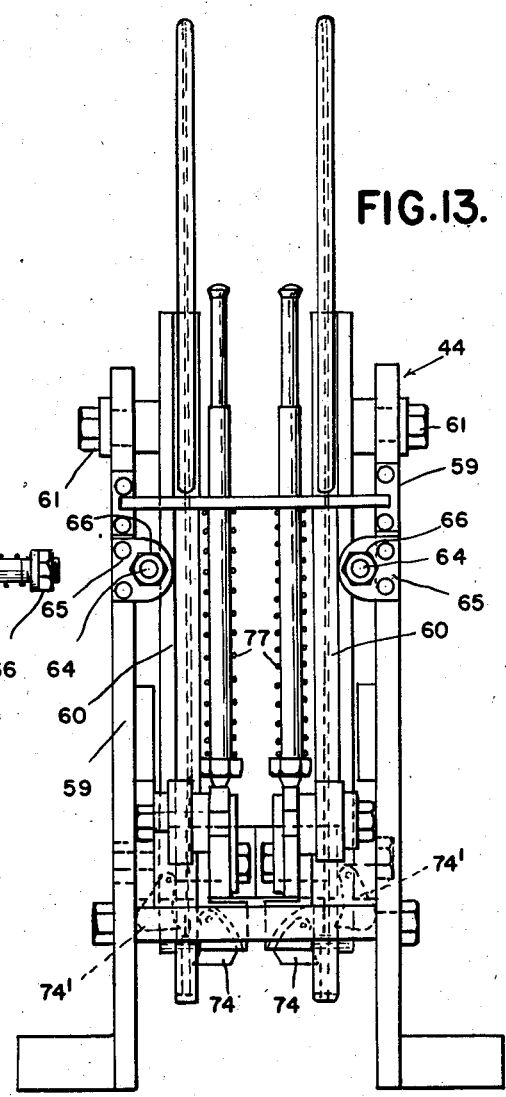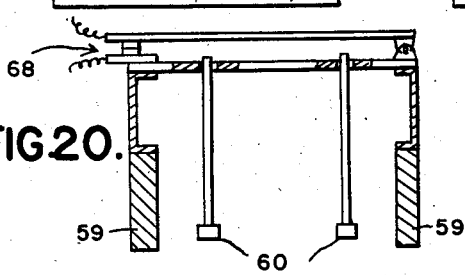

2,363,972

UNITED STATES PATENT OFFICE 2,363,972

METHOD AND APPARATUS FOR MANUFACTURING METAL NAILING STRIPS

Homer G. Kellogg, Detroit, Mich., assignor to Motor Products Corporation, Detroit, Mich., a corporation of New York Application April 20, 1942, Serial No. 439,744

14 Claims. (Cl. 29—33)

This invention relates to an improved method and apparatus for manufacturing metal nailing strips or studs.

Metal nailing strips or studs have been manufactured in the past by rolling two lengths of metal strips to the specified irregular cross sectional contour and by securing the strips together with the contoured portions cooperating to form a circuitous passage from one longitudinal edge to the other for receiving and retaining a nail in place. It has been customary to hold the strips in lateral spaced relationship by bosses extending from one strip toward the other and welded to the latter.

More particularly, the orthodox method of manufacturing metal nailing strips embodied the following three separate and distinct operations. (1) After both strips were rolled to the desired cross sectional contour, at least one of the strips was run through a punch press to form longitudinally spaced bosses on the same. (2) Upon completion of the embossing operations, both strips were placed one on top of the other with the base portions of the bosses engaging the other strip and (3) the two strips were welded together at the points of engagement of the bosses with the adjacent strip. Thus, considerable handling of the strips was required and the time, as well as the cost of production, was correspondingly high.

One of the principal objects of this invention is to roll, emboss and permanently secure the strips in lateral spaced relationship in one continuous operation. As a result, the extent of handling of the strips is reduced to a minimum and the cost, as well as the time required to manufacture nailing strips of the above general type, is correspondingly reduced.

Another object of this invention is to provide a rolling machine having means for simultaneously rolling a pair of strips to the desired cross sectional contour and having means engageable with the strips as the latter leave the last set of forming rolls for spacing the strips and securing the same together.

A further object of this invention is to provide means at the delivery side of the last set of forming rolls for periodically punching the strips to form embossed portions on the top strip and to form aligned openings through the strips having tongues depending from adjacent edges of the openings.

Still another object of this invention is to provide means for successively bending or crimping the depending tongues over the underside of the lowermost strip as the strips continue to advance through the machine.

In some cases it may be desirable to further secure the strips together and to this end the invention contemplates means for riveting the strips together as they leave the crimping means by successively inserting rivets into the openings and bending or crimping the projecting ends of the rivets over as advancement of the strips continues.

The foregoing, as well as other objects, will be made more apparent as this description proceeds, especially when considered in connection with the accompanying drawings, wherein:

Figure 1 is a semi-diagrammatic side elevational view of a metal working machine constructed in accordance with this invention;

Figures 2 to 10, inclusive, are respectively cross sectional views taken substantially on the lines 2—2, 3—3, 4—4, 5—5, 6—6, 7—7, 8—8, 9—9 and 10—10 of Figure 1;

Figure 12 is an enlarged side elevational view of the mechanism for inserting the rivets;

Figure 13 is a front elevational view of the construction shown in Figure 12;

Figure 14 is a fragmentary side elevational view partly in section of the rivet inserting mechanism;

Figure 15 is a sectional view taken substantially on the plane indicated by the line 15—15 of Figure 14;

Figure 16 is a sectional view taken on the line 16—16 of Figure 14;

Figure 17 is a fragmentary side elevational view of a nailing strip or stud capable of being formed by the apparatus shown in the above figures;

Figure 18 is a cross sectional view through the stud;

Figure 19 is a fragmentary sectional view taken substantially on the line 19—19 of Figure 17;

Figure 19A is a cross sectional view of a slightly modified form of the stud construction;

Figure 20 is a diagrammatic sectional view of a switch employed in the machine.

Figure 7:
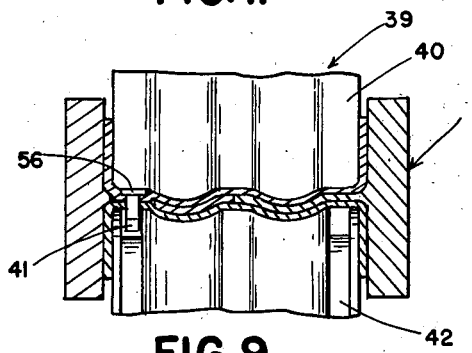

For the purpose of illustrating this invention, I have shown a metal nailing strip in the form of a stud 20 comprising a pair of elongated strips 21 substantially channel shaped in cross section and secured together at opposite longitudinal edges with the base portions 22 in juxtaposition. The base portions 22 are held in lateral spaced relation by means of bearing portions 23 embossed from one of the strips 21 toward the other strip and engageable with the latter strip. As shown particularly in Figure 18, the embossed or bearing portions 23 are formed with openings 24 therethrough and the portions of adjacent strips engaged by the embossed portions 23 are formed with aligned openings 25 therethrough.

Upon reference to Figure 19, it will be noted that the two strips 22 are secured together at the locations of each of the embossed portions 23 by a pair of tongues 26 and 27. The tongue 26 of each pair extends from one of the transverse edges of the opening 24 and the tongue 27 extends in the same direction as the tongue 26 from the adjacent transverse edge of the aligned opening 25. Both of these tongues are bent over the adjacent strip in the manner clearly illustrated in Figure 19 and, as a result, the strips are secured together at each of the bearing points.

In the event an exceptionally strong construction is desired, the two strips are further secured together by means of rivets 28 which respectively extend through the aligned openings 24 and 25. As shown in Figure 18, the rivets are provided with head portions 29 and with split shank portions 30. The head portions 29 of the rivets engage the outer surface of the embossed strip and the extremities of the shank portions of the rivets are bent in opposite directions over the outer side of the other strip 22. The rivets 28 supplement the tongues in securing the two strips together and in some cases may be eliminated.

It will also be noted from Figure 18 that the base portions of both channel shaped strips are fashioned with an irregular cross sectional contour so as to cooperate with one another to form a circuitous space 31 between adjacent strips from one longitudinal edge to the other. The space 31 is of sufficient width to enable a nail to be driven between the two strips and the contour of this space is such as to crimp the nail sufficiently to effectively hold the same in place.

In Figure 19A I have shown a nailing strip 32 in the form of a half stud. The principal difference between the nailing strip 32 shown in Figure 19A and the one previously described is that the former is considerably narrower than the latter and the angular flanges are eliminated from the adjacent longitudinal edges at one side of the strips. Also in Figure 19A the strips are secured together at only one longitudinal edge of the half stud as distinguished from the full stud wherein the strips are secured together along opposite longitudinal edge portions. Otherwise, the construction in Figure 19A is the same as the one previously described and operates in an identical manner.

Owing to the fact that both of the above strips are similar in construction, practically the same method of manufacture may be employed to produce both strips. In the present instance, I have shown one method of manufacturing the stud shown in Figures 17 to 19, inclusive, and it is believed that this illustration will also suffice to disclose the manner in which the strips shown in Figure 19A may be manufactured.

Briefly, it will be noted from Figures 1 to 11, inclusive, that a pair of elongated flat metal strips are progressively and simultaneously rolled to the desired cross sectional contour which is shown in Figure 18 of the drawings. This rolling operation is accomplished by five sets of forming rolls designated by the reference characters 33, 34, 35, 36 and 37. It will suffice to point out at this time that the forming rolls of each set not only cooperate to bend or fashion the strips to the cross sectional contour shown in Figure 18 but are also suitably driven so as to continuously advance the strips during the forming operation. As the strips leave the last set of forming rolls 37, they are spread apart by a suitable separator 38 and are introduced between a set of rolls 39. The top roll 40 of the set 39 is provided with radially outwardly extending circumferentially spaced punches 41 adjacent each end. These punches successively engage the strips and coact with the bottom roll 42 of the set 39 to form the openings 24 and 25 through the strips adjacent opposite longitudinal edges thereof. At the same time, the punches 41 form the embossed portions 23 on the uppermost strip so that the strips are held in spaced relation to each other as they continue to advance beyond the set of rolls 39.

The shape of the punches 41 is such that these punches form the tongues 26 and 27 on the strips as they punch the openings through the strips. In other words, the tongues are struck out from the strips by the punches as the latter form the embossed portions 23 and the aligned openings through the strips.

The tongues are bent over the lowermost strip as the strips leave the set of rolls 39. This is accomplished by a fixture 43 suitably supported at the delivery side of the set of rolls 39 for engagement with the tongues as the strips continue to advance along their path of travel.

While the tongues will serve to secure the two strips together in lateral spaced relationship, nevertheless, in some cases it is advantageous to supplement the tongues with rivets for further securing the strips together. In cases of this character rivets 28 are successively introduced or inserted through the aligned openings in the strips by a device indicated generally in Figure 1 by the reference character 44. The rivets are inserted through the aligned openings from the top of the strips in such a manner that the heads of the rivets engage the uppermost strip and the split shanks of the rivets extend below the lowermost strip. During continued advancement of the strips, the latter are moved between two sets of rolls 45 and 46 which cooperate to spread the shank portions of the rivets and crimp the same over the underside of the bottom strip. The strips leaving the last set of rolls 46 are complete and may be cut to the proper length by suitable cut-off mechanism which is not shown herein.

Referring now more in detail to the apparatus employed in carrying out the above steps of the method, it will be noted from Figures 1 to 11, inclusive, that the first set of rolls 33 merely cooperate to advance a pair of superposed flat strips to the first set of forming rolls 34. The set of rolls 34 comprises a pair of cooperating rolls 47 and 48 supported on opposite sides of the path of travel of the strips and having the peripheral portions contoured to shape the strips to the configuration shown in Figure 3. It will also be noted from Figure 3 that wedge shaped blocks 49 are supported at opposite sides of the set of forming rolls 34 in positions to spread the opposite longitudinal edges of the strips.

The second set of forming rolls 35 are similar to the rolls 34 and coact with wedge shaped blocks 50 to further spread the opposite longitudinal edge portions of the strips. The third set of forming rolls 36 is also similar to the first and second sets 34 and 35 except that the wedge shaped blocks 51 serve to cooperate with opposite sides of the rolls to bend the longitudinal edge portions of the strips at substantially right angles to the path of travel of the strips.

The fourth set of forming rolls 37 comprises a pair of rolls 52 and 53 supported for rotation at opposite sides of the path of travel of the strips and coacts with a pair of rolls 54 to form the right angle flanges on opposite edges of the two strips.

As the strips leave the set of forming rolls 37, they are spread apart by the separator 38. As shown in Figure 7, the separator 38 has an elongated blade 55 which extends between the strips and corresponds in cross sectional contour to the strips. The blade 55 is tapered inwardly toward the set of forming rolls 37 and functions to separate the strips as the latter leave this set of forming rolls. It will also be noted from Figure 7 that the blade 55 extends between the rolls 40 and 42 of the set 39 and is slotted at opposite longitudinal edges to receive the punches 41 on the roll 40.

The above construction is such that both strips are punched while held in spaced relationship by the separator 38 and during the interval the strips pass between the rolls of the set 39. As stated above, the top roll 40 has a plurality of radially outwardly extending punches 41 which are spaced from each other circumferentially of the roll in accordance with desired spacing of the aligned openings through the strips. In manufacturing a full stud of the type shown in Figures 17 to 19, inclusive, the roll 40 is provided with two sets of punches respectively secured to the roll adjacent opposite ends of the latter so as to simultaneously form aligned openings through the strips adjacent the opposite longitudinal edge portions of the strips.

Referring again to Figure 7 it will be noted that each punch 41 is provided with an enlarged portion 56 which serves to emboss the uppermost strip in a direction toward the lower strip and thereby form the bearing portions 23 on the stud. These embossed or bearing portions serve to hold the two strips in lateral spaced relationship after they leave the separator 38. In addition, it will be noted that the extremity of each punch is shaped to not only form the aligned openings 24 and 25 through the strips but to also strike the tongues 26 and 27 from the strips so that these tongues extend in a downward direction. It will be noted from Figure 11 that the blade 55 of the separator 38 is slotted to receive both the tongues and the punch. It will also be observed that the bottom roll 42 of the set 39 has an annular groove opposite each set of punches on the roll 40 to provide clearance for the punches and tongues during the punching operation.

Figure 10:
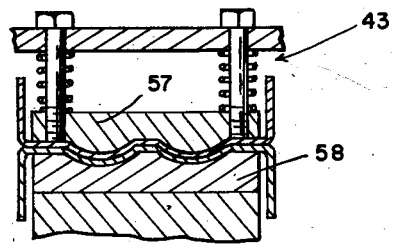
Figure 11:
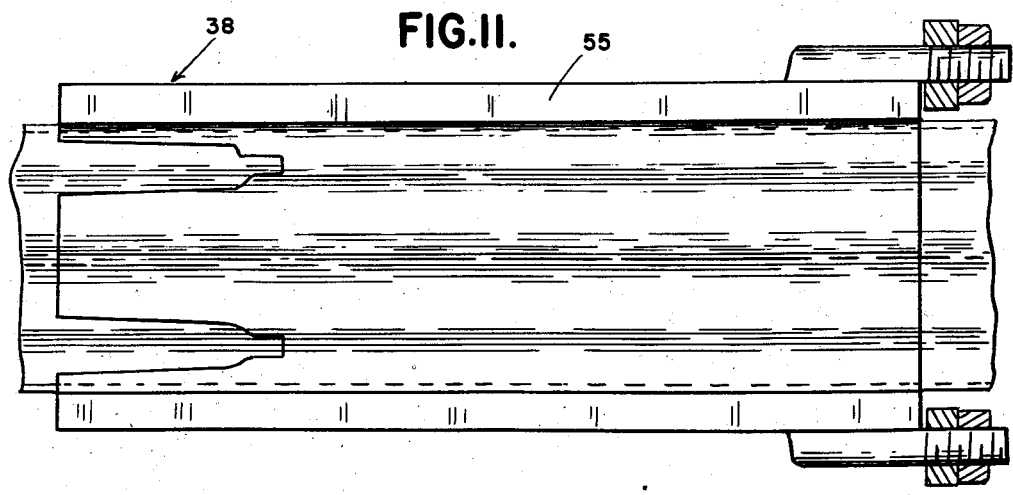
Figure 11 is a fragmentary longitudinal sectional view taken substantially on the line 11—11 of Figure 1.

Referring now to Figure 10 it will be noted that the depending tongues are bent laterally over the adjacent side of the lowermost strip by the device 43. This device comprises a pair of plates 57 and 58 respectively yieldably clamped against opposite sides of the strips in a position to engage the bottom plate 58 with the tongues as the strips leave the punching roll 40.

The bottom plate 58 crimps or bends the tongues over the lowermost strip and thereby secures the strips together. In the event it is desired to further secure the strips together, rivets are successfully introduced into the aligned openings 24 and 25 as the strips leave the device 44. The means for introducing the rivets into the aligned openings through the strips is shown in Figures 12 to 16, inclusive. In detail, the rivet inserting mechanism comprises a frame 59 suitably secured at opposite sides of the path of travel of the strips and having a pair of tubes 60, respectively, pivotally connected at the upper ends to opposite sides of the frame 59 by pins 61. The axes of the pins 61 are aligned and extend at right angles to the path of travel of the strips so that the lower end portions of the tubes may swing in the general direction of advancement of the strips through the machine.

As shown particularly in Figures 12 and 13, the lower end portions of the tubes are yieldably urged into engagement with a stud 62 by means of suitable springs 63. The springs 63 are respectively mounted on a pair of hooks 64 having the rear ends respectively hooked over suitable pins on the two tubes 60 and having the forward end portions projecting through suitable ears 65 which are respectively rigidly secured to opposite sides of the frame 59. The rear ends of the springs abut the adjacent sides of the ears and the forward ends of the springs engage suitable stops in the form of nuts 66 respectively threaded on the forward end portions of the hooks.

Each of the tubes 60 are adapted to support a vertical stack of split rivets 28 and the lower or delivery ends of the tubes normally respectively register with the aligned openings 24 and 25 at opposite sides of the strips. As will be more fully hereinafter set forth, the rivets in the tubes are successively forced into the openings in the strips during movement of the latter along their path of travel. Inasmuch as the strips are moving relative to the delivery ends of the tubes during the interval the rivets are forced into the openings in the strips, there is a possibility of the strips exerting a lateral force on the free ends of the rivets before the latter are released from the tubes and in such instances the tubes are merely swung in the direction of movement of the strips against the action of the springs 63. Swinging movement of one or both of the tubes beyond a certain point indicates that one or both rivets have not properly entered the openings and a suitable switch 68 is automatically opened by either tube to discontinue the operation of the machine.

The rivets are supplied to each tube by means of a chute 69 in the form of a vertical guide having tubular extensions 70 at opposite sides telescopically engageable with a pair of laterally spaced pins 71 extending upwardly from the opposite sides of each tube 60. The guides are constructed in such a manner as to freely slidably support the rivets so that the latter are fed by gravity into the respective tubes. When all of the rivets in the chutes 69 have been fed into the tubes, the empty chutes may be readily removed and replaced with loaded chutes without interrupting the operation of the machine because the tubes are of sufficient length to supply rivets to the work during the interval the chutes 69 are interchanged.

Upon reference to Figure 16 of the drawings, it will be noted that rivets are supported in a vertical stack in each tube 60 by means of a dog 72 supported in a vertical slot formed in the rear side of each tube 60 at the lower end of the latter. The upper end of each dog is pivoted for swinging movement and the lower end of the dog is normally urged into frictional engagement with the lowermost rivet in the tube by means of a spring 73.

The rivets in each tube are successively ejected from the lower end of the tube against the action of the dog 72 by means of a second dog 74. The dogs 74 are respectively pivotally supported at the laterally inner sides of the tubes 60 and the lower ends of the dogs respectively extend through vertical slots in the adjacent sides of the tubes for engagement with the head portions of the rivets in the manner clearly shown in Figure 15. Each rivet ejecting dog 74 is pivoted to a rock arm 75 intermediate the ends of the latter and the rear ends of the rock arms are respectively pivotally secured to the frame 59 in a manner to enable swinging movement of the forward ends of the arms in a vertical plane.

The forward ends of the rock arms 75 are respectively located opposite the two sets of punches 41 carried by the roller 40 and suitable rollers 76 are respectively mounted on the forward ends of the arms 75 for engagement by the punches 41 on the roller 40. The arrangement is such that the extremities of the punches 41 successively engage the rollers 76 and swing the rock arms 75 in an upward direction. Movement of the forward ends of the rock arms in an upward direction lifts the dogs 74 relative to the respective tubes 60 and enables the lower ends of the dogs to engage the head portions of the next adjacent rivet. The rivets are held from upward displacement by the dogs 74 by means of holding dogs 74' respectively pivotally supported on the tubes 60 opposite the dogs 74 and extending through suitable slots formed in the tubes 60.

As soon as the forward end portions of the rock arms 75 are released by the respective punches 41, the rock arms are immediately returned to their lowermost positions by the action of suitable springs 77. As shown in Figures 12 and 13, the lower ends of the springs 77, respectively, engage the upper sides of the rock arms 75 adjacent the forward ends of the latter. Inasmuch as the ejector dogs 74 are respectively carried by the rock arms 75, it follows that these dogs are operated by the springs to quickly eject a rivet from the lower end of each tube 60. Owing to the fact that the rock arms are directly operated by the punches, it follows that the ejecting mechanism operates in perfect timed relation to the punches and the arrangement is such that the lowermost rivets in the tubes 60 are respectively ejected by the dogs 74 into the openings previously formed in the strips by the punches.

The transfer of the rivets from the lower ends of the tubes is practically instantaneous and, therefore, may be accomplished without interfering with the advancement of the strips along their path of travel. Furthermore, the lower end portions of the tubes for the rivets and the associated ejecting mechanism may swing to some extent in the direction of the path of travel of the strips to compensate for any time lag that may exist in the transfer of the rivets from the tubes into the openings in the strips.

Figure 8:
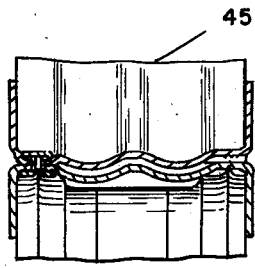
Figure 9:
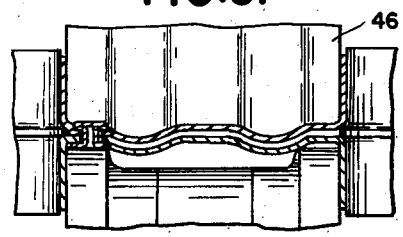

As the strips leave the rivet supplying mechanism 43, they are introduced between the two sets of rolls 45 and 46. As shown in Figures 8 and 9, these rolls cooperate with each other to spread the split shank portions of the rivets and crimp the shank portions of the rivets over the underside of the lowermost strip. The nailing strip or stud is then completed and may be cut to the required lengths by a suitable saw not shown herein.

It will, of course, be understood that all of the cooperating rolls shown in Figures 1 to 9, inclusive, are driven by suitable drive mechanism which is not shown herein. It will also be understood that the same principles of operation are used in forming the half stud shown in Figure 19A. However, in forming the half stud 19A, the contour of the various sets of coacting rolls is changed to correspond to the contour shown in Figure 19A and the spreading blocks 49 to 51, inclusive, as well as the rolls 54, are eliminated from one side of the respective sets of forming rolls because it is only necessary to form flanges at one longitudinal edge of the half stud. Moreover, one set of punches 41 on the roll 40 and one of the rivet supply tubes 60 with its associated mechanism may also be eliminated because the strips of the half stud are merely secured along one longitudinal edge.

What I claim as my invention is:

1. In a metal working machine, means for advancing a pair of strips in superposed relation along a predetermined path of travel, means for periodically embossing one of the strips toward the other to hold said strips in lateral spaced relationship, and means for securing the embossed portions on said one strip to the adjacent surface of the said other strip during continued advancement of the strips by the first named means.

2. In a metal working machine, means for advancing a pair of strips in superposed relation along a predetermined path of travel, means for separating said strips as the latter are advanced along said path of travel, means for periodically embossing one of the strips toward the other to hold the strips in lateral spaced relationship, and means for securing the embossed portions on the said one strip to the adjacent surface of the other strip during continued advancement of the strips by the first named means.

3. In a metal working machine, means for advancing a pair of strips in superposed relation along a predetermined path of travel, means for periodically embossing one of the strips toward the other to hold said strips in lateral spaced relationship, and for punching aligned openings through the embossed portions and adjacent portions of the other strip to form tongues projecting laterally from the strips, and means for bending the tongues over the side of the adjacent strip during continued advancement of the strips by the first named means.

4. In a metal working machine, means for advancing a pair of strips in superposed contacting relation along a predetermined path of travel, means for separating said strips as the latter are advanced along said path of travel, means for periodically punching aligned openings through both strips as the latter are separated and advanced along said path of travel to provide laterally projecting tongues on the strips and embossed spacers between the strips, and means for crimping the tongues over the side of the adjacent strip during continued advancement of the strips by the first named means.

5. In a metal working machine, means for advancing a pair of strips in superposed contacting relation along a predetermined path of travel, means for separating said strips as the latter are advanced along said path of travel, means for periodically punching aligned openings through both strips as the latter are separated and advanced along said path of travel to provide laterally projecting tongues on the strips and embossed spacers between the strips, means for crimping the tongues over the side of the adjacent strip during continued advancement of the strips by the first named means, means for successively inserting headed rivets in the openings as advancement of the strip continues, and means for crimping the ends of the rivets against the adjacent strip to further secure the strips together.

6. In a metal working machine, means for advancing a pair of strips in superposed contacting relation along a predetermined path of travel, means for periodically punching aligned openings through both strips as the latter are separated and advanced along said path of travel to provide laterally projecting tongues on the strips and embossed spacers therebetween, means for crimping the tongues over the adjacent strip upon continued advancement of the strips, means for inserting a rivet in each of the openings during continued advancement of the strips, and means for crimping the free ends of the rivets over the adjacent strip to further secure the strips together in spaced relation.

7. In a metal working machine, means for advancing a pair of strips in superposed relation along a predetermined path of travel, means for periodically embossing one of the strips toward the other to hold said strips in lateral spaced relationship, means for successively punching registering openings through the embossed portions and adjacent portions of the other strip to form tongues extending laterally from the strips, means successively engageable with the tongues as advancement of the stock continues to bend the tongues against the adjacent strip, means also operable upon continued advancement of the strips to successively insert split rivets through the aligned openings, and means for crimping the rivets over the adjacent strip to further fasten the strips together.

8. In a metal working machine, a plurality of sets of rolls cooperating with each other to progressively fashion the strips to an irregular cross sectional contour and to advance the strips along a predetermined path of travel, means engageable with the strips as the latter leave the last set of forming rolls for separating the strips, means for periodically embossing one of the strips toward the other to maintain the strips in lateral spaced relationship, means for punching the strips at the locations of the embossed portions to form aligned openings through the strips and to form laterally projecting tongues on the strips, means successively engageable with the tongues to bend the tongues over the adjacent strip upon continued advancement of the strips, means for successively inserting rivets in the openings, and means for crimping the ends of the rivets over the adjacent strip to further secure the strips together.

9. In a metal working machine, a plurality of sets of rolls cooperating with each other to progressively fashion a pair of contacting strips to an irregular cross sectional contour and to advance the strips along a predetermined path of travel, means engageable with the strips as the latter leave the last set of forming rolls for separating the strips, means supported at opposite sides of the path of travel of the strips for periodically punching aligned openings through the strips for forming laterally projecting tongues on said strips and embossed spacers between the separated strips, and means successively engageable with the tongues to bend the latter over the adjacent strip.

10. In a metal working machine, a plurality of sets of rolls cooperating with each other to progressively fashion the strips to an irregular cross sectional contour and to advance the strips along a predetermined path of travel, means engageable with the strips as the latter leave the last set of forming rolls for separating the strips, means for periodically embossing one of the strips toward the other to maintain the strips in lateral spaced relationship, means for punching the strips at the locations of the embossed portions to form aligned openings through the strips and to form laterally projecting tongues on the strips, means successively engageable with the tongues to bend the latter over the adjacent strip, means operated by the last named means for successively inserting rivets into the openings as advancement of the strip continues, and means successively engageable with the rivets during continued advancement of the strip for crimping the rivets over the adjacent strip.

11. The method of manufacturing metal nailing strips, comprising progressively rolling superposed strips to an irregular cross sectional contour and advancing the strip along a predetermined path of travel, spacing the strips laterally from each other as the strips continue along their path of travel by periodically embossing one strip toward the other to form longitudinally spaced bearing portions, striking tongues in the same direction from both strips at the points of embossment by punching both strips during continued advancement of the strips, and securing the strips together in lateral spaced relationship by bending the tongues over the adjacent strip.

12. The method of manufacturing metal nailing strips, comprising progressively rolling superposed strips to an irregular cross sectional contour and advancing the strips along a predetermined path of travel, spacing the strips laterally from each other as the strips continue along their path of travel by periodically embossing one strip toward the other to form longitudinally spaced bearing portions, simultaneously striking tongues in the same direction from both strips at the locations of the bearing portions by punching the strips during advancement of the strips along said path of travel, securing the strips together by bending the tongues over the adjacent strip and by riveting the strips at the points of bearing aforesaid.

13. In a metal working machine, means for advancing a pair of superposed contacting strips and simultaneously forming the same to a non-rectilinear transverse contour, means for separating said advancing strips, means for punching the separated advancing strips to form registering apertures therein, tongues struck out from said aperture and through one of the strips and embossed spacers for holding said strips separated, and means for crimping said tongues during continued advancement to secure said strips together in spaced relation.

14. In a metal working machine, a plurality of sets of rolls cooperating with each other to progressively fashion the strips to an irregular cross sectional contour and to advance the strips along a predetermined path of travel, means engageable with the strips as the latter leave the last set of forming rolls for separating the strips, means for periodically embossing one of the strips toward the other to maintain the strips in lateral spaced relationship, means for punching the strips at the locations of the embossed portions to form aligned openings through the strips and to form laterally projecting tongues on the strips, and means successively engageable with the tongues to bend the tongues over the adjacent strip upon continued advancement of the strips.

HOMER G. KELLOGG.